Aug. 10, 1937. R. F. PEO ET AL 2,089,418
VALVING ASSEMBLY FOR HYDRAULIC SHOCK ABSORBERS
Filed Feb. 8, 1936 3 Sheets-Sheet 1
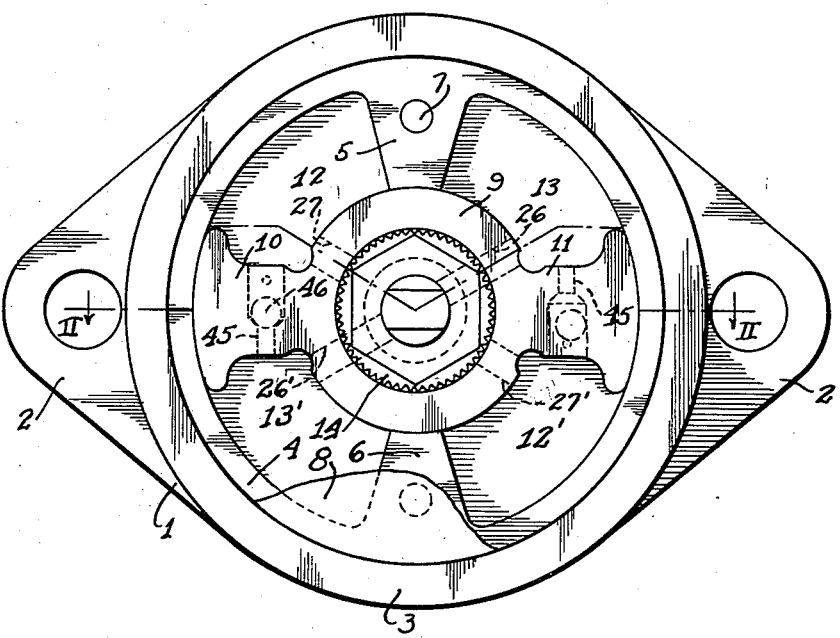
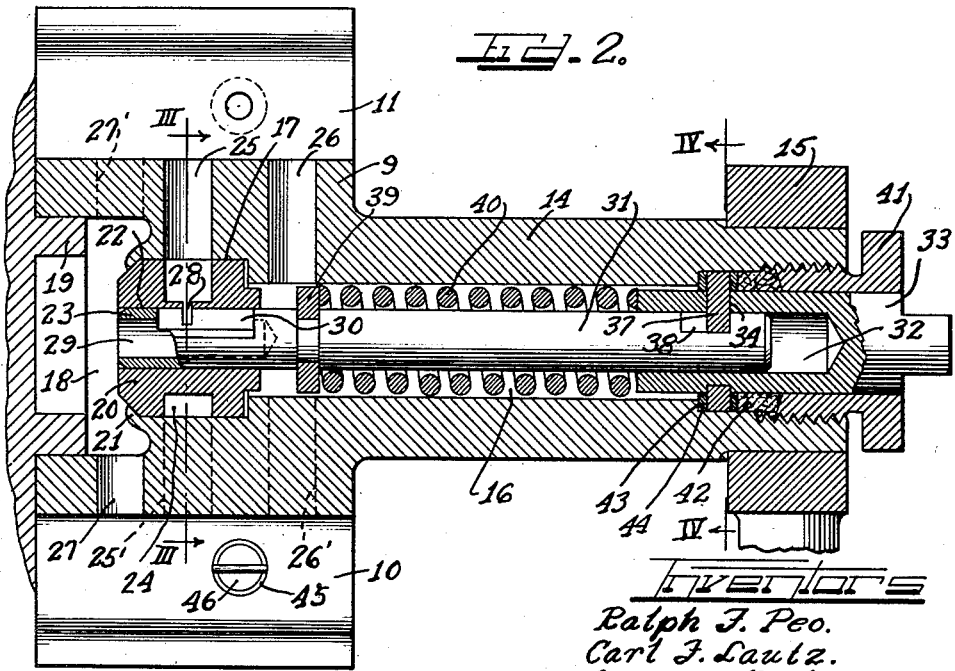
Inventors
Ralph F. Peo.
Carl F. Lautz.
Gervase M. Magrum.

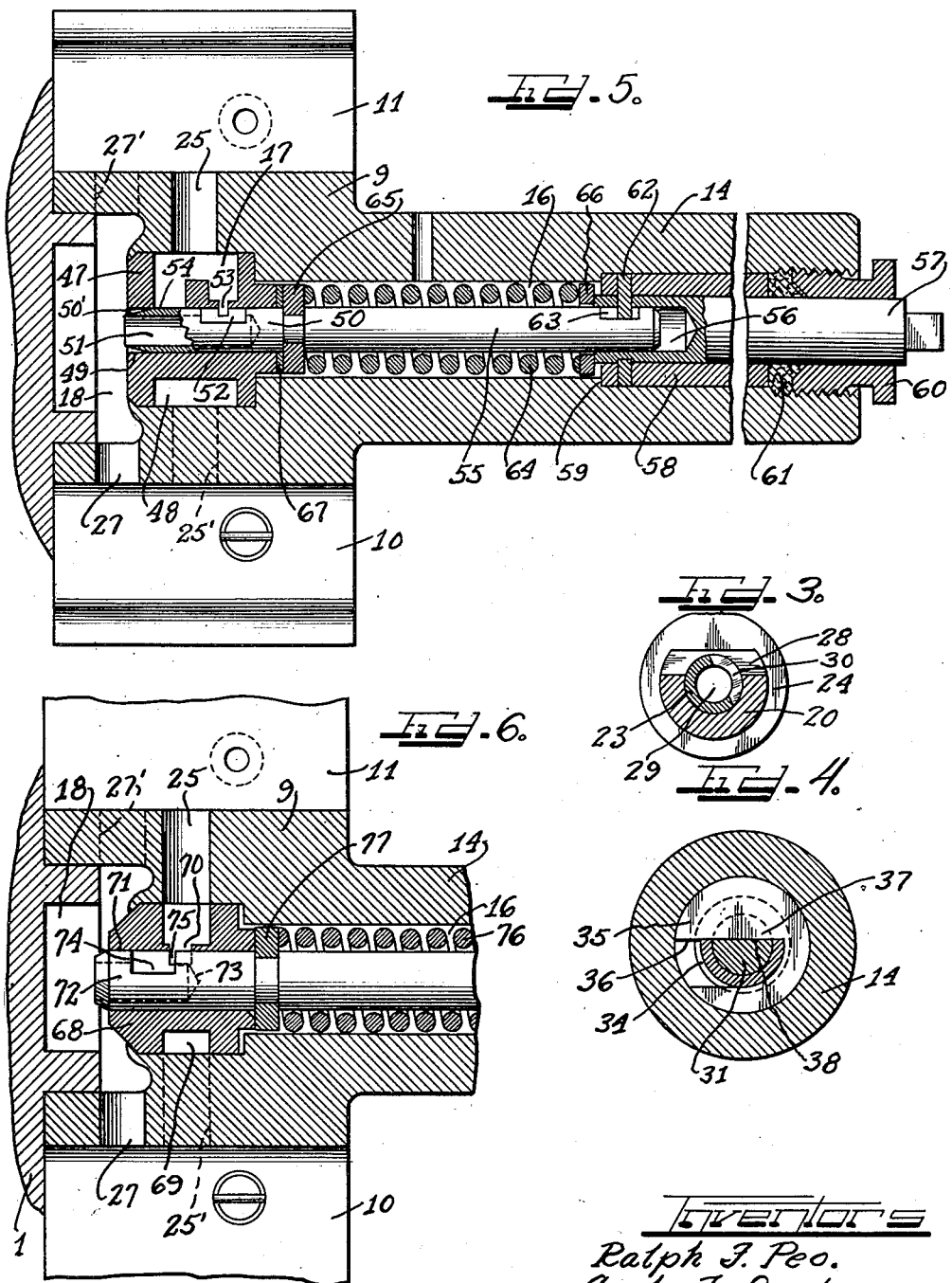

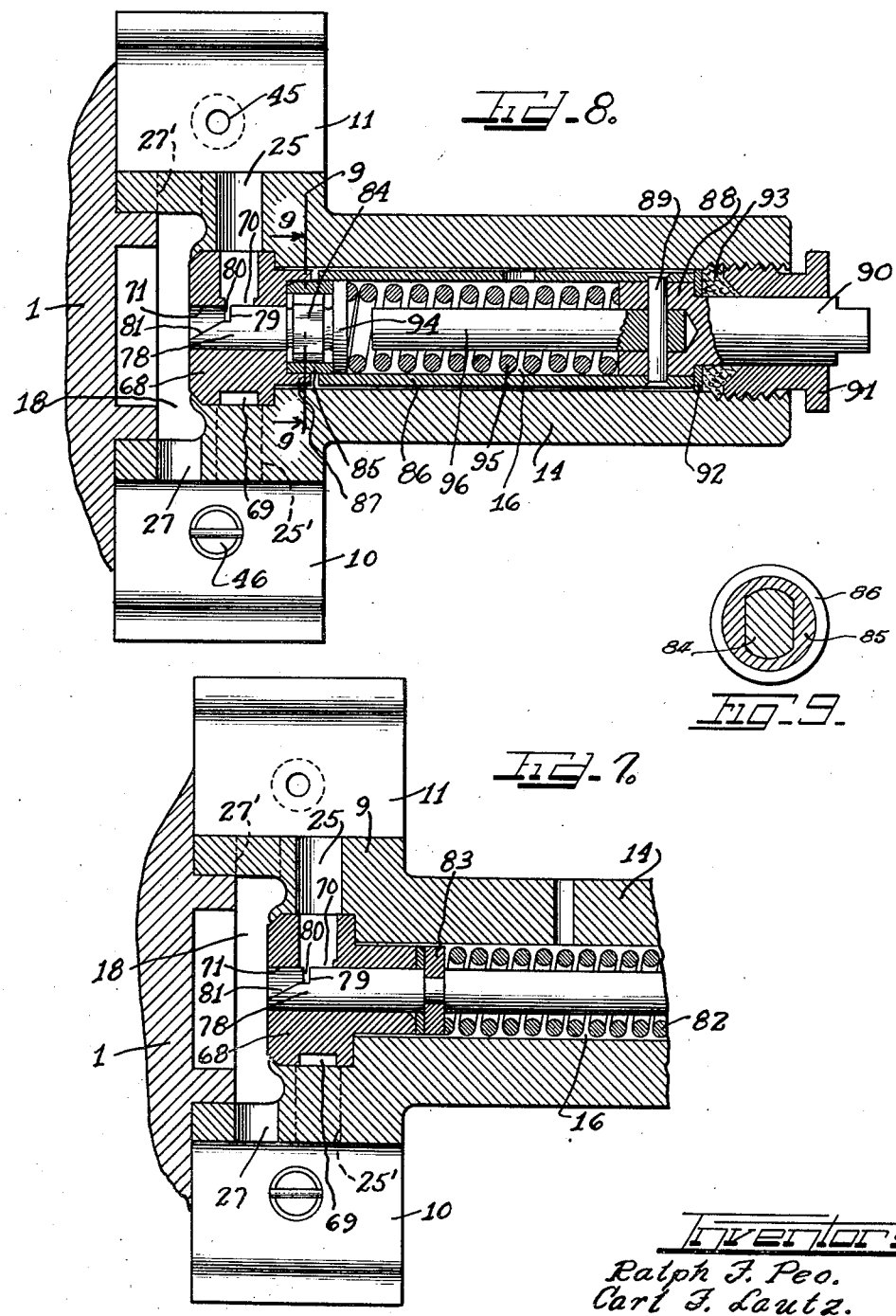

Patented Aug. 10, 1937

2,089,418

UNITED STATES PATENT OFFICE 2,089,418

VALVING ASSEMBLY FOR HYDRAULIC SHOCK ABSORBERS

Ralph F. Peo, Carl F. Lautz, and Gervase M. Magrum, Buffalo, N. Y., assignors to Houde Engineering Corporation, Buffalo, N. Y., a corporation of New York Application February 8, 1936, Serial No. 62,942

15 Claims. (Cl. 188—100)

This invention relates to improvements in valving assembly adapted particularly for controlling the hydraulic fluid flow in shock absorbers associated with the vehicle springs of automotive vehicles.

An important object of the invention is to provide a valving assembly involving a short restricted metering orifice which will tend to meter the fluid flow uninfluenced by variation in viscosity of the hydraulic fluid and whose degree of exposure to fluid flow may be adjusted by manual setting of a valve member together with provision for movement of the valve by fluid pressure against spring resistance to increase the size of the metering orifice or to provide additional passageways for fluid flow at times when the pressure becomes abnormal or the fluid is comparatively thick due to low temperatures, in order that strain on the shock absorber parts and the connections thereof with a vehicle may be prevented.

A further important object is to provide a valving assembly in which a valve member may be adjusted manually to set a metering orifice for metering of the hydraulic fluid flow during normal pressure and temperature conditions and which is movable against spring resistance to act as an unloading valve for providing increased fluid passageway during abnormal pressure or temperature conditions.

Still another object of the invention is to provide a unitary valving assembly which can be readily removed from a shock absorber for replacement by another valving assembly having different metering and spring characteristics.

The various features of the invention are incorporated in the structure shown on the accompanying drawings, in which drawings:

Figure 1 is a plan view of a hydraulic shock absorber with part of the cover removed and showing the application of our improved valving assembly;

Figure 2 is a section on plane II—II of Figure 1, showing the details of the valving assembly;

Figure 3 is a section on plane III—III of Figure 2;

Figure 4 is a section on plane IV—IV of Figure 2;

Figures 5, 6, 7 and 8 are views similar to Figure 2, but showing modified valve structures, and Figure 9 is a section through the valve structure on plane IX—IX Figure 8.

The shock absorber to which we have shown the valving assemblies applied is of the so-called rotary type. Briefly describing the structure, it comprises a base 1 having ears 2 for securing into a support as for example the chassis of an automobile. The annular wall 3 extends from the base and within this wall is the ring 4 from which extends the abutment partitions 5 and 6, this ring structure being secured by pins 7 extending through the abutment partition and into the base 1. The outer end of the annular wall 3 is closed by a cover structure 8 which may be secured by threaded engagement with the wall 3.

Within the ring 4 is the cylindrical piston hub 9 which extends between the abutment partitions 5 and 6 and which has piston vanes 10 and 11 extending therefrom for bearing engagement with the ring, this piston structure together with the partition members dividing the space within the ring and between the base and cover structure 8 into high pressure chambers 12 and 12' and low pressure chambers 13 and 13' from which the fluid is displaced as the piston structure oscillates.

A shaft 14 extends from the piston hub 9 and at its outer end is journalled in the cover structure 8 in a well known manner, the shaft at its outer end having applied thereto a lever 15 (Figure 2) for connection usually with the axle of the vehicle so that during relative movement between the chassis and axle the piston structure will be oscillated for displacement of the hydraulic fluid.

Referring particularly to Figure 2, the shaft has the cylindrical bore 16 therethrough, the bore extending a distance into the hub 9 for communication with the intermediate bore 17 of larger diameter, the inner end of the hub having the cylindrical bore of still greater diameter to form a chamber 18, the bore receiving the aligning lug 19 on the base 1 for journaling the piston structure at its inner end.

Within the intermediate bore 17 is the seating member 20 which may be secured in position as by deflecting against its outer end the metal at the outer edge of the bore, as indicated at 21. This seating member has the cylindrical axially extending bore 22 for seating a cylindrical valve plug 23, and the member is surrounded by a circumferential channel 24 which is in communication with passageways 25 and 25' extending radially through the hub 9 and communicating with the low pressure working chambers 13 and 13' of the shock absorber. Similar passages 26 and 26' connect the inner end of the shaft bore 16 with the low pressure working chambers 13 and 13', the chamber 18 at the inner end of the piston structure hub being connected by passages 27 and 27' with the high pressure working chambers 12 and 12' of the shock absorber.

Referring particularly to Figure 3, the seating member 20, at the bottom of the channel 24 therein, is slitted tangentially to provide a narrow and short orifice slit 28 connecting the channel with the bore 22 in which the valve plug is seated. The valve plug has the axially extending bore 29 and the plug is slotted transversely at one side of its bore to provide a port 30 between the valve bore and the orifice slit 28, the outer end of the valve bore being in communication with the chamber 18 which is connected by the passages 27 and 27' with the shock absorber high pressure working compartments 12 and 12'.

The valve plug has the stem 31 extending therefrom through the shaft bore 16, the outer end of this stem engaging in the bore 32 of a plug 33 having threaded engagement with the threaded outer end of the shaft bore. Referring to Figure 4, the plug 33 has the slot 34 which at one side communicates with the plug bore 32, and a stop washer 35 has a slot 36 whereby it may be moved transversely into engagement with the plug slot to fit into the shaft bore concentric with the plug and to project a distance into the plug bore as indicated at 37. The washer end 37 projects into a notch 38 in the valve stem, the washer end thus forming a stop for limiting the longitudinal movement of the stem and the valve plug.

Between the inner end of the plug 33 and an abutment collar 39 on the stem adjacent to the valve plug is interposed a compression spring 40 which encircles the stem, the spring tending to hold the valve structure in its inner position with the outer end of the notch 38 abutting the washer end 37 and to resist outward movement of the valve structure. A gland 41 surrounds the outer end of the plug 33 and has threaded engagement with the threaded outer end of the shaft bore, packing material 42 being interposed between the inner end of the gland and the washer 35 to hold the washer seated against a shoulder 43, washers 44 being preferably provided at opposite sides of the abutment member 35. These washers and the packing material will also serve to prevent leakage of hydraulic fluid from the shaft bore to the exterior at the outer end thereof.

The spring abutment collar 39 adjacent the outer end of the valve plug is spaced a distance from the outer end of the seating member 20 and the length of the valve port 30 longitudinally of the valve plug is such that the port will be entirely within the seating member 20 when the valve plug and stem structure is in its innermost position, as shown on Figure 2. With this position, the valve bore 29 is out of communication with the passages 26 and 26' leading to the low pressure working chambers of the shock absorber.

Briefly describing the operation, during rebound movement of the vehicle spring with which the shock absorber is associated, the fluid displaced from the high pressure working compartments 12 and 12' will flow through passageways 27 and 27', chamber 18, and into the bore 29 of the valve plug and from there through the valve port 30 and orifice slit 28 into the circumferential channel 24 from where the flow is through the passages 25 and 25' to the low pressure working compartments 13 and 13' of the shock absorber. The resistance to such flow is determined by the degree of overlap of the orifice slit 28 by the valve port 30, adjustment of the overlap for the desired resistance being accomplished manually by turning of the plug 33 after the gland 41 has been removed or loosened. Such turning of the plug is communicated to the valve stem by the washer 35.

The short narrow orifice slit through which the fluid flows will tend to compensate for change in viscosity of the hydraulic fluid and under normal pressure and temperature conditions all of the fluid flow, during rebound movement of the vehicle spring, will be through the metering orifice slit. There are times when the vehicle is subjected to rough road conditions during which the hydraulic fluid will be subjected to abnormal pressure and under such conditions the spring 40 will yield and permit outward shift of the valve structure by the fluid pressure to bring the valve port 30 into communication with the space outside of the seating member 20 and into communication with the passages 26 and 26' leading to the low pressure working chambers so that an additional path is provided for the fluid flow until pressure conditions again become normal and the spring returns the valve plug to its inner position.

In cold weather when the fluid thickens it cannot flow so freely through the metering orifice under the displacement pressure thereagainst by the piston structure, but under such conditions the valve plug will be shifted against the resistance of the spring to open up the additional path through the passages 26 and 26' until the fluid has been warmed up sufficiently for normal flow conditions. The extent of outward movement of the valve structure is determined by the abutment of the inner end of the valve stem notch 38 against the abutment end 37 of the washer 35.

During compression movement of the vehicle spring less hydraulic resistance is required and therefore larger passageways 45 may be provided through the piston vanes 10 and 11 which passageways are provided with check valves such as balls 46 which will open the passageways for flow from the low pressure working chambers to the high pressure chambers in addition to whatever flow there might be through the orifice 28, but the check valves close these passages during rebound movement of the vehicle springs so that all the flow must be through the restricted orifice.

It will be noted that the valve assembly is a unitary assembly which can be readily removed from the shock absorber after the gland 41 has been removed, and repairs may therefore be readily made or valve replacements made depending upon the service desired.

In the modified arrangement shown in Figure 5, the valve seating member 47 in the intermediate bore 17 of the hub 9 has a wide circumferential channel 48 communicating with the passages 25 and 25' from the low pressure working chambers 13 and 13' of the shock absorber, the auxiliary passages 26 and 26' shown in Figure 2 being here omitted. The seat member 47 has the axial bore 49 for the valve plug 50, which valve has the bore 51 extending thereinto from the inner end thereof. The valve plug has the cross cut or notch 52 therein forming a port adjacent to the outer side of the channel 48, the channel at this point being cut deeper and slotted to form the circumferentially extending short restricted orifice 53 communicating with the valve port.

At its inner side the channel 48 is cut down and through to provide a port 54 communicating with the bore 49 but normally closed by the inner end of the valve plug.

The valve adjustment and movement controlling arrangement of Figure 5 is quite similar to that shown in Figure 2, the valve stem 55 engaging at its outer end in the bore 56 of the adjusting plug 57 within the sleeve 58 which engages in the shaft bore against a shoulder 59, a gland member 60 threading into the end of the shaft bore to engage against packing 61 for holding the sleeve seated. The abutment washer 62 extends through the sleeve and through one side of the plug 57 and into the notch 63 in the valve stem to control the longitudinal movement of the valve plug and stem. A spring 64 encircles the stem between a collar 65 on the stem adjacent the valve plug, and an abutment washer 66 at the inner end of the plug 57. The spring exerts a constant pressure tending to hold the valve plug in its inner position with the collar 65 abutting the outer end of the seat member 47. In order to prevent impact noise a cushioning washer 67 may be provided at the end of the seat member.

Describing the operation of the structure of Figure 5, during rebound movement of the vehicle spring the hydraulic fluid displaced from the high pressure working chambers 12 and 12' flows through the passages 27 and 27' into chamber 18 and into the valve bore and then through the valve port 52 and the orifice 53 into the channel 48 of the seating member and then through passages 25 and 25' to the low pressure chambers, the resistance to such flow being determined by the degree of overlap by the valve port 52 of the orifice 53. Under normal pressure and temperature conditions the port 54 will be closed by the valve plug so that all the fluid flow must be through the restricted orifice. Under abnormal pressure conditions the spring 64 will yield for outward movement of the valve plug by the pressure for opening of the port 54 directly to the chamber 18 to provide an additional flow path from the high pressure working chambers to the low pressure working chambers by way of the bore 49 of the seat member and the seat member port 54 and channel 48, and this additional path will remain open until normal pressure conditions are re-established and the valve plug is shifted back by the spring to close the port 54. In order that this additional path may be gradually opened to fluid flow, the end of the valve may be tapered as indicated at 50'. During opening of this additional path the valve port 52 remains in communication with the orifice 53 so that some of the fluid may flow by way of the orifice.

In the modified arrangement of Figure 6, the valve seating member 68 has the circumferentially extending channel 69 which is cut down at one side to leave a shallow but comparatively wide orifice port 70 communicating with the bore 71 in which the valve plug 72 is seated. This valve plug has the bore 73 and is cut away at one side so as to leave the circumferentially extending port 74 whose inner side wall is parallel with the outer side wall of the port 70 and spaced a short distance therefrom to leave a narrow orifice slit 75.

The valve setting and valve movement resisting means may be like that provided for the valve in Figure 5, the spring 76 holding the valve stem collar 77 normally against the outer end of the seat member 68 for determining the normal width of the orifice passage 75. By rotational manual adjustment of the valve the circumferential overlap by the valve port of the seat member port 70 is set. During normal pressure and temperature conditions the fluid flow, during rebound movement of the vehicle spring, will be from the high pressure working chambers 12 and 12' through the passages 27 and 27' and chamber 18 and into the valve bore 73, the flow being then through the exposed orifice passageway 75 to the annular channel 69 on the seat member and then through passages 25 and 25' to the low pressure working chambers. Under abnormal pressure conditions the spring 76 will yield for outward movement of the valve plug and corresponding widening of the orifice passage 75, this increase in the size of the orifice relieving the excess pressure until normal conditions are resumed and the spring returns the valve to its normal position for normal width of the orifice passage.

In the modified arrangement shown in Figure 7 the valve structure and operation is substantially the same as that shown in Figure 6 except that the valve does not have a bore. Like in the structure of Figure 6, the seat member 68 of Figure 7 has the annular circumferential channel 69 cut down on one side to provide a comparatively wide port 70 communicating with the bore 71 of the seat member. The valve plug 78 is cut transversely on one side near its end to provide a radial wall 79 for cooperating with the inner side wall of the port 70 to determine the width on the orifice passage 80, the valve end beyond the wall 79 being cut away on the bias for tapering as indicated at 81 in order to provide passageway for flow of fluid from the chamber 18 to the orifice passage 80.

The valve setting and movement resisting spring structures may be the same as that shown in either Figures 2 or 5, the spring 82 holding the collar 83 on the valve stem normally against the outer end of the seat member 68 for the normal width of the orifice passage 80. During normal pressure conditions during rebound movement of the vehicle springs the fluid flows from a high pressure working chambers 12 and 12' through the passages 27 and 27' and chamber 18, then through the bore of the seat member and through the orifice passage 80 and through the passages 25 and 25' to the low pressure working chambers. Under abnormal pressure conditions the spring 82 will yield for outward shifting of the valve to correspondingly widen the orifice passage 80 for increased flow passageway for relief of excess pressure until normal pressure conditions are resumed and the spring again shifts the valve for normal width of the orifice passage.

In the modified arrangement of Figure 8, the cooperation of the valve with the seat structure is substantially the same as that shown in Figure 7. The valve adjusting and valve controlling movement is somewhat different. The valve plug at its outer end has a guide hub 84 engaging in the neck 85 of a cylindrical sleeve 86 extending through the shaft bore 16, the neck 85 having guide engagement in the annular flange 87 extending outwardly from the seat member 68. The outer end of the sleeve 86 receives the head 88 and is secured thereto as by means of a pin 89, the stem 90 on the head 88 extending outwardly through a gland 91 having threaded engagement in the outer end of the shaft bore 16. A washer 92 surrounds the stem 90 and abuts the outer end of the sleeve 86 and this washer is engaged by packing material 93 forced thereagainst by the gland 91 so that the shell 86 is held at its inner position with its neck 85 in the seat member flange 87 and abutting the seat member.

At its other end the valve plug has a head 94 having guide fit in the sleeve 86, and a compression spring 95 within the sleeve 86 abuts against the valve head 94 and the inner end of the head 88 on the stem 90. A stop pin 96 is secured to the head 88 by the pin 89 and extends inwardly to within a short distance of the valve head 94 and forms a stop for limiting the outward movement of the valve structure. By loosening the gland 91 the stem 90 and the sleeve 86 may be turned, and in order that the valve plug will turn therewith the head 84 thereon is flatted on one or more sides and the sleeve neck 85 is correspondingly shaped on the inside as clearly shown by Figure 9. By such manual turning of the valve the extent of the circumferential overlap of the valve port 79 and the seat member port 70 may be determined for the desired resistance flow through the orifice passage 80. Under normal conditions of pressure, the size of the orifice will be maintained by the spring pressure, but under abnormal pressure conditions the spring will yield for outward shift of the valve plug and corresponding widening of the orifice passage for increased flow for relief of excess pressure.

In our improved valving assembly we thus have provided a valve element which is manually rotatable for setting thereof for determination of the normal size of the restricted metering orifice, the valve being axially movable by excess pressure against a predetermined spring resistance to provide for increased or additional fluid passageways for relieving the excess pressure so that the shock absorber may efficiently function when subjected to abnormal or excess pressure conditions and without straining any of the shock absorber parts or the connection between the shock absorber and the vehicle.

We have shown practical and efficient embodiments of the various features of our invention but we do not desire to be limited to the exact construction, arrangement and operation shown and described as changes and modifications may be made without departing from the scope of the invention.

We claim:

1. A valving assembly for controlling the fluid flow in a hydraulic shock absorber, comprising a seat member having a cylindrical bore, a cylindrical valve plug extending through said bore, said seat member having a radially short circumferentially extending orifice passage communicating with said bore, said valve plug having a port registering with said orifice passage, means adapting said valve plug for manual rotary setting for adjusting the overlap of said orifice passage by said valve port to define a restricted orifice, means adapting said valve plug for axial movement, a spring resisting such axial movement, means defining a fluid flow path through said valve plug and including said valve port and orifice, and means defining a second path including said valve port and arranged to be opened only when said valve plug is moved axially against resistance of the spring.

2. A valve assembly for controlling the fluid flow through a hydraulic shock absorber, comprising a seat member having a cylindrical bore therethrough, a cylindrical valve plug extending through said bore, said seat member having a radially short circumferentially extending orifice passage communicating with said bore, said valve plug having a bore and a port alined with said orifice passage, means adapting said valve plug for manual rotary setting for adjustment of the overlap of said orifice passage by said valve port to define a restricted orifice, said valve plug being adapted for axial movement, a spring resisting such axial movement and normally holding said valve plug with its port entirely within said seat member, the fluid flow being solely through said orifice and valve bore when said valve plug is in normal position, axial shifting of said valve against resistance of said spring exposing said valve port to the exterior of said seat member whereby to provide for increased fluid flow through said valve bore independently of said orifice.

3. A valving assembly for controlling the fluid flow in a hydraulic shock absorber, comprising a seat member having a cylindrical bore therethrough, a cylindrical valve plug in said bore, said seat member having a radially short circumferentially extending passage therethrough communicating with said bore, said valve plug having a port spanning said seat member passage, said valve plug being adapted for manual rotary setting for adjustment of the overlap of said seating member passage by said port to define a restricted orifice, said valve plug having a bore communicating with said port, said seat member having a port normally closed by said valve plug, said valve plug being arranged for axial movement in said seat member bore, a spring yieldably holding said valve plug in normal position, said valve plug when in normal position restricting the fluid flow through the valve bore and the restricted orifice, axial movement of said valve exposing said seat member port for additional fluid flow independently of said valve bore and orifice.

4. A valving assembly for controlling the fluid flow in hydraulic shock absorbers, comprising a seat member having a bore therethrough, a cylindrical valve plug seating in said bore, said seat member having a short radial passage extending circumferentially in communication with said bore, said valve plug having a circumferentially extending port one edge of which is adjacent to one edge of said seat member passage whereby to define a narrow orifice, said valve plug being adapted for manual rotary setting to adjust the overlap of said seat passage by said valve port to define a restricted orifice, said valve plug being arranged to be shifted axially by fluid pressure for widening of said orifice, and spring means for resisting such axial movement of the valve plug.

5. A valving assembly for controlling the fluid flow in hydraulic shock absorbers, comprising a seat member having a bore therethrough, a cylindrical valve plug seating in said bore, said seat member having a short radial passage extending circumferentially in communication with said bore, said valve plug having a circumferentially extending port one edge of which is adjacent to one edge of said seat member passage whereby to define a narrow orifice, said valve plug being adapted for manual rotary setting to adjust the overlap of said seat passage by said valve port to define a restricted orifice, said valve plug being arranged to be shifted axially by fluid pressure for widening of said orifice, and adjustable spring means for resisting axial movement of the valve plug.

6. A valving assembly for controlling the fluid flow in a hydraulic shock absorber, a seat member having a cylindrical bore, a cylindrical valve plug seated in said bore, said seat member and said valve plug having circumferentially overlapping ports defining a restricted orifice for fluid flow, said valve plug being arranged for manual rotary setting for adjustment of the degree of overlap of said port for any desired size of the restricted orifice, said valve plug being arranged to be moved axially by abnormal fluid pressure and against spring resistance for widening of said orifice for increased flow therethrough to compensate for the excess pressure.

7. A valving assembly for controlling the fluid flow in a hydraulic shock absorber, comprising a seat member having a cylindrical bore, a cylindrical valve plug seated in said bore, said seat member and said valve plug having cooperating circumferentially extending ports partially overlapped to define a radially short orifice, means whereby said valve plug may be rotatably set manually for adjusting the degree of overlap of said ports for the desired flow resistance therethrough, said valve plug being axially shiftable in said seat member for widening of said orifice, a spring resisting such axial movement of the valve plug and tending to hold it in position for normal width of said orifice, whereby said valve plug may act as an unloading valve when subjected to pressure and to increase the width of said orifice in accordance with the fluid pressure.

8. A valving assembly for controlling the fluid flow in a hydraulic shock absorber, comprising a seat member having a cylindrical bore, a cylindrical valve plug seated in said bore, said seat member and said valve plug having cooperating circumferentially extending ports partially overlapped to define a radially short orifice, means whereby said valve plug may be rotatably set manually for adjusting the degree of overlap of said ports for the desired flow resistance therethrough, said valve plug being axially shiftable in said seat member for widening of said orifice, a spring resisting such axial movement of the valve plug and tending to hold it in position for normal width of said orifice, whereby said valve plug may act as an unloading valve when subjected to pressure and to increase the width of said orifice in accordance with the fluid pressure, and means for adjusting the tension of said spring.

9. A valve assembly for a hydraulic shock absorber comprising a piston structure operable between high and low pressure hydraulic working chambers and having a bore connected by passages respectively with the high and low pressure working chambers, said valve assembly comprising a seat member in said bore interposed between the high and low pressure passages and having a cylindrical bore, a cylindrical valve plug seated in said seat member bore, said seat member and valve plug having ports adapted for variable overlap by rotary setting of said valve plug to define a restricted orifice, means for effecting manual rotary setting of said valve plug, said valve plug being axially shiftable in said seat member bore, a spring in the piston structure bore tensioned to resist such axial movement of the valve plug, the arrangement being such that fluid pressure against said valve plug in excess of the spring resistance pressure will shift the valve plug for increasing the width of said orifice for increased flow therethrough from the high pressure working chamber to the low pressure working chamber.

10. A valve assembly for a hydraulic shock absorber comprising a piston structure operable between high and low pressure hydraulic working chambers and having a bore connected by passages respectively with the high and low pressure working chambers, said valve assembly comprising a seat member in said bore interposed between the high and low pressure passages and having a cylindrical bore, a cylindrical valve plug seated in said seat member bore, said seat member and valve plug having ports adapted for variable overlap by rotary setting of said valve plug to define a restricted orifice, means for effecting manual rotary setting of said valve plug, said valve plug being axially shiftable in said seat member bore, a spring in the piston structure bore tensioned to resist such axial movement of the valve plug, the arrangement being such that fluid pressure against said valve plug in excess of the spring resistance pressure will shift the valve plug for increasing the width of said orifice for increased flow therethrough from the high pressure working chamber to the low pressure working chambers, and means in the piston structure bore for effecting adjustment of the spring tension.

11. A valving assembly for controlling the fluid flow in a hydraulic shock absorber comprising a seat member having a bore, a valve plug seated in said bore, means whereby said seat member and valve plug cooperate to define a radially short circumferentially extending fluid flow metering orifice, means for manually rotatably setting said valve plug for adjusting the circumferential length of said orifice, said valve plug being arranged to be shifted by excess fluid pressure to effect widening of said orifice for increased flow therethrough, and a spring tending to resist such axial movement of the valve plug.

12. A valving assembly for controlling the fluid flow in a hydraulic shock absorber comprising a seat member having a bore, a valve plug seated in said bore, means whereby said seat member and valve plug cooperate to define a radially short circumferentially extending fluid flow metering orifice, means for manually rotatably setting said valve plug for adjusting the circumferential length of said orifice, said valve plug being arranged to be shifted by excess fluid pressure to effect widening of said orifice for increased flow therethrough, and a spring tending to resist such axial movement of the valve plug, and means for adjusting the tension of said spring.

13. A valve assembly for a hydraulic shock absorber comprising a piston structure operable between high and low pressure hydraulic working chambers and having a bore and passages providing a fluid flow path between said chambers, said valve assembly comprising a seat member disposed in said path, a valve plug supported by said seat member and adapted for axial shift by the pressure of the fluid flow through said path, said seat member having two ports for inclusion in said path and controlled by said valve, yielding means acting to hold said valve against shift under normal fluid pressure conditions and with only one of said ports exposed in said path but permitting shift of said valve under abnormal pressure conditions for exposure of both of said ports in said path, said valve being manually rotatable from the exterior of said bore for adjusting the size of the flow area of one of said ports.

14. A valve assembly for a hydraulic shock absorber comprising a piston structure operable between high and low pressure hydraulic working chambers and having a bore and passages providing a fluid flow path between said chambers, said valve assembly comprising a seat member in said bore interposed in said path, said seat member having two ports for inclusion in said path, one of said ports being for restricted flow and the other port for freer flow through said path, a valve shiftable by fluid pressure relative to said seat member and controlling said ports, and spring means holding said valve against normal pressure with only the restricting port exposed in said path but yielding under abnormal pressure for shift of the valve for exposure of both ports in said path, said valve being rotatable for adjusting the size of the flow area of said smaller port.

15. A valve assembly for a hydraulic shock absorber comprising a piston structure operable between high and low pressure hydraulic working chambers and having a bore and passages providing a fluid flow path between said chambers, said valve assembly comprising a seat member disposed in said path, a valve supported by said seat member and adapted for axial shift by the pressure of the fluid flow through said path, said valve having a port and said seat member having two ports adapted for inclusion in said path by exposure to said valve port, yielding means acting to hold said valve against shift under normal fluid pressure conditions and with only one of said seat ports exposed to said valve port but permitting shift of said valve under abnormal pressure conditions for exposure of both of said ports to said valve port, said valve being rotatable for adjusting the size of the flow area of one of said ports.

RALPH F. PEO.
CARL F. LAUTZ.
GERVASE M. MAGRUM.